United States Patent
Martos Fernández et al.

(10) Patent No.: US 12,475,737 B2
(45) Date of Patent: Nov. 18, 2025

(54) IMAGE ANALYSIS SYSTEM FOR FORENSIC FACIAL COMPARISON

(71) Applicants: UNIVERSIDAD DE GRANADA, Granada (ES); PANACEA COOPERATIVE RESEARCH S. COOP., Ponferrada (ES)

(72) Inventors: Rubén Martos Fernández, Ponferrada (ES); Enrique Bermejo Nievas, Ponferrada (ES); Oscar Ibáñez Panizo, Ponferrada (ES); Andrea Valsecchi, Ponferrada (ES); Pablo Mesejo Santiago, Granada (ES); Alexsandro Vasconcellos Da Silva, Granada (ES); Fernando Navarro Merino, Granada (ES); María Inmaculada Alemán Aguilera, Granada (ES); Oscar Cordón García, Granada (ES); Sergio Damas Arroyo, Granada (ES)

(73) Assignees: UNIVERSIDAD DE GRANADA, Granada (ES); PANACEA COOPERATIVE RESEARCH S. COOP., Ponferrada (ES)

( * ) Notice: Subject to any disclaimer, the term of this patent is extended or adjusted under 35 U.S.C. 154(b) by 369 days.

(21) Appl. No.: 17/909,268

(22) PCT Filed: Mar. 5, 2021

(86) PCT No.: PCT/ES2021/070162
§ 371 (c)(1),
(2) Date: Sep. 2, 2022

(87) PCT Pub. No.: WO2021/176126
PCT Pub. Date: Sep. 10, 2021

(65) Prior Publication Data
US 2023/0088742 A1  Mar. 23, 2023

(30) Foreign Application Priority Data
Mar. 6, 2020 (ES) ............... ES202030191

(51) Int. Cl.
*G06V 40/16* (2022.01)
*G06V 10/10* (2022.01)
(Continued)

(52) U.S. Cl.
CPC ............ *G06V 40/172* (2022.01); *G06V 10/16* (2022.01); *G06V 10/26* (2022.01); *G06V 10/34* (2022.01); *G06V 10/82* (2022.01); *G06V 20/70* (2022.01)

(58) Field of Classification Search
CPC ...... G06V 40/172; G06V 20/70; G06V 10/82; G06V 10/16; G06V 10/26; G06V 10/34
See application file for complete search history.

(56) References Cited

U.S. PATENT DOCUMENTS

| 7,113,641 B1* | 9/2006 | Eckes ................. G06V 40/172 348/169 |
| 2006/0078172 A1* | 4/2006 | Zhang ................. G06V 40/168 382/118 |

(Continued)

FOREIGN PATENT DOCUMENTS

WO   WO-2016011204 A1 *  1/2016  ......... G06K 9/00248

OTHER PUBLICATIONS

Martos, Rubén, et al. "Estimation of 2D to 3D dimensions and proportionality indices for facial examination." Forensic science international 287: 142-152, Jun. 2018 (Year: 2018).*

(Continued)

*Primary Examiner* — Oneal R Mistry
*Assistant Examiner* — Nhut Huy Pham
(74) *Attorney, Agent, or Firm* — CASIMIR JONES, S.C.; Brian F. Bradley

(57) ABSTRACT

An automatic forensic facial comparison system, FFC, having a questioned image (I1) and a reference image (I2), captured by means of acquisition of images of a subject, comprising processing means configured to carry out FFC steps: at least one morphological analysis stage (11), mandatory, and optionally a holistic comparison stage (12), and/or an image overlay stage (13), and/or a photo-anthropometry stage (14), and/or a decision-making stage (15). For each stage (11, 12, 13, 14) corresponding to FFC methods, the processing means calculate an overall indicator value of the stage carried out. In the last decision-making stage (15), the processing means calculate a fuzzy value by applying soft computing, obtained as a sum of the overall indicator value of each stage previously carried out (11, 12, 13, 14), each value being weighted by a weight based on a set of data (Continued)

to support the decision-making stage (15) indicative of a degree of reliability of each stage and of the quality of the starting images (I1, I2).

9 Claims, 2 Drawing Sheets

(51) Int. Cl.
*G06V 10/26* (2022.01)
*G06V 10/34* (2022.01)
*G06V 10/75* (2022.01)
*G06V 10/82* (2022.01)
*G06V 20/70* (2022.01)

(56) References Cited

U.S. PATENT DOCUMENTS

| | | | | |
|---|---|---|---|---|
| 2016/0371537 | A1* | 12/2016 | He | G06F 18/214 |
| 2018/0130324 | A1* | 5/2018 | Yu | G08B 13/19697 |
| 2020/0143148 | A1* | 5/2020 | Sobh | G06V 10/95 |
| 2020/0184278 | A1* | 6/2020 | Zadeh | G06N 3/044 |

OTHER PUBLICATIONS

Yang, Wei-Jong, et al. "Multi-feature shape regression for face alignment." EURASIP Journal on Advances in Signal Processing 2018, published 2018 (Year: 2018).*

A. Abdelwhab, S. Viriri. A Survey on Soft Biometrics for Human Identification. Intechopen, Dec. 4, 2018, [online] retrieved on Feb. 3, 2021. <url: https://www.intechopen.com/books/machine-learning-and-biometrics/a-survey-on-soft-biometrics-for-human-identificatoin>.
K. Jain, U. Park. Facial marks: Soft Biometric for face recognition. 2009 16th Ieee International Conference on Image Processing (icip), Dec. 31, 2009, p. 37-40 [online] retrieved on Feb. 3, 2021. Retrieved from <url: https://ieeexplore.ieee.org/abstract/document/5413921>; abstract.
Saez Trigueros, Li Meng, M. Hartnett. Face Recognition from Traditional to Deep Learning Methods. Researchgate, Oct. 31, 2018, p. 1-13 [online] retrieved on Feb. 3, 2021. <url: https://www.researchgate.net/publication/328685305_Face_Recognition_From_Traditional_to_Deep_Learning_Methods/link/5d19cd21a6fdcc2462b4a85f/download>.
Mei Wang, Weihong Deng. Deep Face Recognition: a Survey. Dec. 2, 2019, pp. 1-26 [online] retrieved on Feb. 3, 2021, <url: https://arxiv.org/pdf/1804.06655v8.pdf>.
Wikipedia. Weighted Arithmetic Mean. 15 p. Dec. 12, 2019 [online] retrieved on Feb. 3, 2021 <url: http:/web.archive/org/web/20191212034426/https://in.wikipedia.org/wiki/Weighted_arithmetic_mean>.
Wikipedia. AdaBoost. 10 p. Aug. 28, 2019 [online] retrieved on Feb. 3, 2021 <url: http:/web.archive/org/web/20190828120041/https://in.wikipedia.org/wiki/AdaBoost>.
International Search Report, International Patent Application No. PCT/ES2021/070162, dated May 12, 2021, English translation.

* cited by examiner

IMAGE ANALYSIS SYSTEM FOR FORENSIC FACIAL COMPARISON

OBJECT OF THE INVENTION

The present invention is related to artificial intelligence that is applied in the industry dedicated to medical systems, and, specifically, in the field of forensic identification. More particularly, the present invention relates to an image analysis system, based on machine vision and machine learning, for use in forensic facial comparison and to assist the forensic expert in decision making.

BACKGROUND OF THE INVENTION

Human facial identification is of the utmost importance in solving serious legal and social dilemmas. For example, it helps stop criminals of all kinds (including people implicated in terrorism cases), locate missing persons, expose identity theft, and increase the capacity of state security forces and bodies to protect society. Methods that aid human identification through facial imaging or analysis can be referred to as "facial imaging methods". These methods include facial approximation, photographic overlay, age estimation/regression, construction of robot portraits from eyewitness memory, facial recognition systems and facial comparison. Generally, the procedure for comparing facial images by human experts comprises two well-differentiated stages:

Facial Recognition (FR): An automated search is carried out by entering a facial image (image under investigation) in a database, said image is automatically encoded by the system using an algorithm that generates a list of facial images with a series of candidates, ranked based on similarity to the reference image. The candidate list may or may not contain the person represented in the reference image and does not imply that that person is inherently on that list. These systems are based on the use of biometric technologies.

Facial Identification (FI): Following the automatic matching by means of FR, qualified and experienced officials proceed to the review, selecting the candidate images proposed by the system and manually comparing them with the image under investigation, examining the images carefully in order to find unique characteristics that can determine if they belong to the same person or not. In any current operating environment that uses facial biometrics, the act of FI is where a human facial examiner (or a group of examiners) is responsible for making a decision as to whether the person shown in two different images is the same.

Within the FI, the Forensic Facial Comparison (FFC) comprises the manual examination of the similarities and differences (or dissimilarities) between two facial images, with the aim of determining whether it is the same person who appears in both. FFC processes are generally employed by expert officials who work within the security, government, national defense, and academic institutions for research purposes (be it scientific-academic or police-legal). These processes include the following casuistry:

Facial evaluation, which involves a superficial, usually rapid, one-to-one comparison process of a facial image with a living subject, in order to verify their identity. A paradigmatic example of this process is traffic controls, when an officer stops a vehicle and asks the driver for his drivers license to verify his identity.

Facial review, which involves a more complex comparison process performed between an image (or set of images) and a subject. An example of this process is when, at a border control, the alarm of a possible suspect goes off when the pedestrian who is going to cross is caught by surveillance cameras. The images of the pedestrian are compared to a database of possible criminals/terrorists using an FR system. A border control officer receives the candidate images from the system and must carry out a rapid morphological analysis (in situ) to determine whether to stop that person or allow him to pass.

Facial examination is the formal and systematic process by which two or more facial images are compared. An example of this systematic process is the same used in fingerprint matching, called ACE-V (Analysis, Comparison, Evaluation and Verification). A trained crime lab examiner examines and compares the images obtained from a recording with an image of the suspect and provides his opinion in an expert report to be used in a judicial process. Generally, FFC is used in settings that require a facial examination.

FFC describes the manual process of comparing two or more facial images to determine if they correspond to the same person, for the purpose of determining the identity of a person or, if there is no correspondence, excluding a subject of known identity. There are different methods available for FFC, which are typically done by juxtaposed images (putting one image next to the other), or by overlaying (especially in the case of 2D-3D or 3D-3D comparison). Generally, FFC methods can be grouped into 4 categories: (1) holistic comparison, which consists of simultaneously evaluating all facial features and comparing them with another face or image of another face; (2) photo-anthropometry, based on the measurement of dimensions, anthropological landmark angles and other facial features to quantify proportions, comparing measurements taken from one image with those taken from another image; (3) overlay, which consists of superimposing two aligned images for visual comparison with the help of image transitions such as wipe, fade, and toggles; and (4) morphological analysis, based on the evaluation of the correspondence of the shape, appearance, presence and/or location of the facial features, including an overall description (corresponding to the face in general), a local description (corresponding to the anatomical structures such as the nose or mouth and their components) and individualizing facial marks such as scars, tattoos or moles.

However, despite being a widely used and useful method in criminal investigations by police in different countries, FFC application is still based on a manual comparison of images through a tedious, subjective and error-prone visual inspection process. This process depends entirely on the skill and experience of the expert. As a consequence, its usefulness is reduced due to the time required for its application, the degree of training and professional experience of the evaluator, as well as errors related to fatigue.

On the other hand, the different existing and previously described FFC methods present a series of drawbacks:

Holistic face comparison is negatively affected by the use of suboptimal images, specifically in relation to lighting. Although holistic comparison can be used on any facial image and does not require restrictive conditions (same pose, angle, orientation, etc.) as other techniques, the accuracy rates are low and variable.

Photo-anthropometry has a limited discriminatory power given the uncontrolled conditions under which many questioned images are captured (for example, Closed Circuit Television, CCTV, or surveillance images), which prevent defining a threshold limit of similarity or dissimilarity in measurements to support an identification or exclusion conclusion. The biggest limitation when applying photo-anthropometry is that the images used must meet a series of very restrictive conditions to achieve reliable results, these conditions are hardly met in most forensic cases. These conditions are listed below:

Sufficient resolution for the location and marking of facial landmarks (the scientific term for these points or marks is "cephalometric or somatometric points") of interest.
Minimal compression artifacts
Minimal distortion
Same point of view
Same lighting
Minimal darkening
Known focal length
Known lens distortion
Known camera-subject distance
Known pose angle
Same aspect ratio
Same pose
Similar expression
Minimum time interval between photographs As in photo-anthropometry, the conditions under which reliable results can be achieved through the application of the facial overlay technique are very restrictive and rarely occur in forensic cases.

The morphological analysis, although it is intuitively logical, presents several problems in the development of taxonomies and in their subsequent application, for which computing methods for automatic classification of facial features are needed. In addition, the conclusions of the morphological analysis are based on the relationship of similarities and differences through a subjective evaluation and interpretation of the observations.

In conclusion, there is no proposal that brings FFC procedure closer to the real world and, in particular, to that of forensic identification. Some of the proposals only focus on a particular identification method and consequently do not face the problem of combining the results of the different FFC methods that the evaluator may employ. The objective technical problem that arises is therefore to provide an automatic system with objective and reproducible automated procedures of FFC that allow speed up the execution time of the processes involved in human identification through facial comparison techniques, while avoiding subjectivity and lack of reproducibility in identifications.

DESCRIPTION OF THE INVENTION

The present invention serves to solve the aforementioned problem, by means of facial identification techniques, more specifically, for forensic facial comparison, with which consistencies and inconsistencies between two facial images are automatically analyzed, compared and searched, allowing the human identification from digital images obtained by means of photographic cameras, closed circuit television, video surveillance cameras or three-dimensional (3D) scanning, etc.

The present invention is applied in the identification of human beings when there are at least:
(i) an image under investigation of a person whose identity is unknown (questioned/doubted) and a reference image of a person of known identity (undoubted), or,
(ii) a questioned image object of investigation and another questioned reference image, to determine if the face that appears in the images corresponds to the same person (whose identity is unknown: doubted).

The present invention relates to a computer-deployable facial identification process from the automatic comparison of two facial images, comparing (i) an image under investigation questioned against an image of a person of known identity, and/or, (i) an image under investigation questioned against an image of a person with unknown identity. In a preferred implementation, at least one of the two facial images, a priori the one obtained at the later instant in time, can be a three-dimensional facial image obtained from the 3D scan of a subject's face. The term "subject" refers in the present invention to humans. The term "facial image" includes images of a person in which the face can be seen, both two-dimensional (such as a digital photograph) and three-dimensional (such as a 3D scan of the face, obtained by laser, photogrammetry, structured light, etc.). The term "doubted image" (or "questioned image") refers, in general, to the image of a subject of unknown identity. The term "undoubted image" refers, in general, to an image of a subject of known identity.

The present invention takes into account the quality of the images and the precision of the different Forensic Facial Comparison (FFC) methods, being able to provide objective information on human identification that supports the final decision of the expert.

The present invention constitutes a "decision-making support system", which refers to a computerized system that, automatically or semi-automatically, assists the expert in carrying out a complex high-level task, such as a medical diagnosis or forensic identification. In the specific case of FFC, the tasks in which the system can help an expert range from the automatic realization of reports of similarities and differences between two facial images, to filtering cases from the list of candidates proposed by an FR system, or obtaining the most likely candidate or candidates.

The present invention allows a forensic expert to be assisted in decision-making regarding the identification of persons by comparing facial images. Said decision-making stage is based on a fuzzy hierarchical analysis model that, in particular embodiments, is complemented by four previous stages related to morphological analysis, holistic comparison, facial overlay and photo-anthropometry. The term "fuzzy hierarchical model" or "fuzzy hierarchical analysis model" refers to a model made up of several levels of information aggregation, each one with a different degree of abstraction, ordered from simplest to most complex, where the value of a level depends on the output of the previous one together with new information of that level. One aspect of the invention relates to an image analysis system for forensic facial comparison comprising the following components:

image acquisition means to acquire at least one questioned image of a subject (of unknown identity, subject of whom facial identification is to be made),
processing means with access to the questioned image and at least one reference image (of a subject of known or unknown identity); where the processing means automatically perform the forensic facial comparison comparing the questioned image with the reference image, where the processing means is configured to perform at least one forensic facial comparison stage which is the stage of morphological analysis using neural networks and a decision-making stage.

Optionally, the processing means can perform more forensic facial comparison stages, which in total comprises up to five stages: morphological analysis stage (mandatory), holistic comparison stage (optional), image overlay stage (optional), photo-anthropometry (optional), and decision-making stage (mandatory). The processing means for each forensic facial comparison stage provide an overall indicator value of the stage performed. In the last stage, the decision-making stage, the processing means calculate a fuzzy value by applying soft computing, where the fuzzy value is obtained as the sum of the overall indicator value of each forensic facial comparison stage previously carried out by the means of processing, where each value used in the sum is weighted by a weight defined based on a set of data to support the decision-making stage indicative of a degree of reliability of the forensic facial comparison stage performed (morphological analysis and/or holistic comparison and/or image overlay and/or photo-anthropometry) and indicative of the quality of the starting images (questioned image and reference image).

The advantages of the present invention compared to the state of the prior art are fundamentally that:

- It allows to integrate and perform in an automated way a whole series of methodologies (holistic comparison, photo-anthropometry, overlay and morphological analysis) necessary for the identification by comparison of facial images, instead of being carried out separately and manually.
- The automatic aggregation of all existing information (such as image quality, overlays, compatibility of measurements and proportions, compatibility of morphological characteristics and individualizing elements, as well as the precision and value of the errors committed in each one of the processes) facilitates the decision of the forensic expert in each of the methodologies and, therefore, results in a single overall value that helps in making a final decision by the forensic expert.
- It allows to carry out both the pre-processing of facial images and their overlay, automatically, without requiring any type of expert intervention. In the specific case of image overlay using a 2D facial image and a 3D facial image, the need to manually replicate the pose and perspective effect of the 2D image, or to perform the comparison only with a reduced set of 2D projections obtained through rotation, with predetermined angles, of the 3D model, is eliminated. In a particular embodiment, the present method can automatically search for the projective transformation that, applied to the 3D model, generates the projection most similar to the 2D image.
- It allows to provide objective data to quantify a subjective process and save computing time when providing this data.

BRIEF DESCRIPTION OF THE FIGURES

Next, a series of drawings will be described very briefly that help to better understand the invention and that expressly relate to an embodiment of said invention that is presented as a non-limiting example thereof.

PREFERRED EMBODIMENT OF THE INVENTION

An image analysis system is proposed for FFC comprising:

Means of capturing or acquiring images of a subject, which refer to any system that allows to obtain facial images such as cameras, closed circuit television, video surveillance cameras, structured light scanners, photogrammetry systems, etc.

Information processing means to execute the stages of the image analysis procedure described below, from two starting/input images, questioned image and reference image, at least the questioned image being obtained from the means for Capture images of the subject. In a preferred embodiment, the processing means refers to a high computing capacity server that the user accesses as a web service.

The image analysis procedure comprises five stages: morphological analysis stage, holistic comparison stage, overlay stage, photo-anthropometry stage, and decision-making stage. The decision-making stage occupies the upper hierarchical level (to support the decision-making of the human expert), while the other four are those that provide numerical information to the higher stage to be able to conclude if both images correspond to the same person. Preferably, the morphological analysis stage is always carried out, the other three stages being optional and dependent on the quality of the images.

Figure 1:
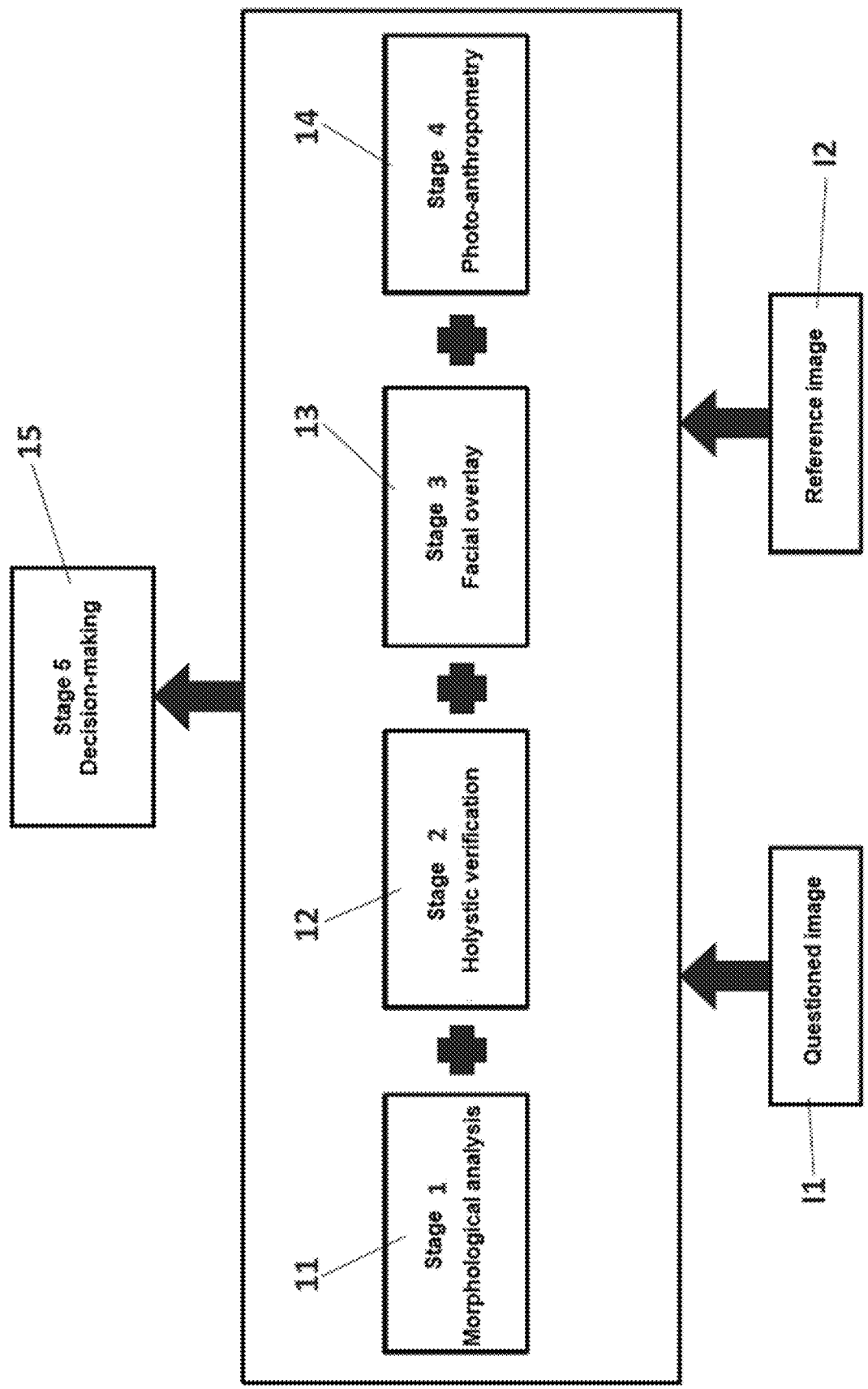
FIG. 1.—It shows a block diagram (flow chart) of the five stages of the automatic forensic facial comparison procedure, according to a preferred embodiment of the invention.

FIG. 1 shows a flow chart of a preferred embodiment of the forensic facial comparison scenario with the five stages. It starts with two images, a questioned image (I1) and a reference image (I2), which can have the same dimensionality (2D-2D or 3D-3D) or different dimensionality (2D-3D or 3D-2D). The five stages are carried out automatically without any kind of intermediation by the human expert. For each pair of images, provided they meet the necessary conditions, the process of morphological analysis (I1) is carried out in stage 1, holistic comparison (I2) in stage 2, overlay (I3) in stage 3 and photo-anthropometry (I4) in stage 4. Otherwise, only the specific stages for which the images meet the requirements are carried out, stage 1 being mandatory, and stages 2, 3 and 4 optional. Each stage provides at its output a quality value that, in turn, is used in decision-making (I5) in stage 5. The result of said final stage involves the generation of a report that supports the identification by means of exclusion or compatibility of images.

Each of the five stages that make up the procedure are described below: stage of morphological analysis (I1), stage of holistic comparison (I2), stage of overlay (I3), stage of photo-anthropometry (I4) and stage of decision-making (I5).

A specific embodiment is presented, particularized to a forensic identification scenario by comparing 2D facial images, based on two facial images: one, from documents (identification records, national identity document, NID, or similar) from which the reference image (I2) is extracted, and another, the doubted or questioned image (I1), obtained by the image acquisition means and from the internet, surveillance camera or other source.

STAGE 1. Morphological analysis (I1) through automatic labeling of morphological criteria and automatic detection of individualizing elements. Starting from the questioned image (I1) and the reference image (I2), the system carries out a labeling with morphological descriptors of the images (I1, I2) by means of a first neural network. Subsequently, a second neural network locates those individualizing elements (scars, moles, etc.) present in both images (I1, I2). The third step consists of an algorithm that performs a mirror transformation to measure the degree of symmetry. Finally, it provides a quality value, E1, that both images belong to the same subject. The first neural network is a multiclass network capable of automatically classifying the facial features of a face. The second neural network is a multi-tasking network capable of detecting individualizing aspects on one face (that is, those features with greater morphological significance). The asymmetry calculation is carried out by means of a reflex transformation, calculating the difference between an image and its mirror image.

At this stage, several automatic procedures are distinguished:
  i) Labeling with morphological descriptors of the images.
  ii) Detection of individualizing elements in images.
  iii) Calculation of asymmetry in the images.
  iv) Obtaining a single overall indicator of the morphological analysis through the aggregation of the values provided by the three previous procedures.

i) Labeling with Morphological Descriptors

A multiclass neural network ("multi-output learning network") automatically labels the photographs with a series of morphological descriptors. In an exemplary embodiment, the input images have a size of 224×224 pixels and the network used is Resnet101, whose output layer consists of a fully connected layer with 27 neurons, corresponding to each of the 27 morphological descriptors to classify. In the training of the network, the most discriminating criteria are chosen (27 in total), and the error made when labeling each of them is estimated, calculating with that estimate, through the aggregation of the errors made by each criterion, the overall mistake made in labeling a photograph. The minimum ideal sample size of the labelled photographs required for the network training has been estimated in 1620: 27 criteria for 3 mean morphologic descriptors in each criterion and 20 required images for each criterion. Once the neural network is applied to both images (the questioned and the reference), two integer vectors of dimensionality 27 are available. To measure how similar the two faces are based on these criteria, these vectors are compared and a single value is provided that measures, globally, the similarity of both faces according to the 27 morphological criteria used. For this, two types of criteria are distinguished: those in which any value other than the desired one is considered an error, regardless of the distance from said error; and those where there is a continuity between values, so that it is possible to establish a gradation that goes from being a little wrong to being very wrong. In conclusion, to integrate both types of criteria, it is used a hybrid distance counting the errors as 0 or 1 in those criteria wherein all errors are the same (being 0 absence of error), and counting a value between 0 and 1 in those cases wherein a larger distance corresponds to a greater error.

As an example let's imagine two vectors with three positions/descriptors (each with 3 classes). The vector corresponding to the reference/undoubted image is [0, 1, 2], and the vector corresponding to the questioned/doubted image is [0, 0, 0]. If the first two descriptors correspond to variables in the distance between classes that matter, while the last does not, then: The error for the first position is 0, since both values coincide (it is not an error, but a success). The second position has an error of 0.5, since the difference between 0 and 1 (|0−1|) is calculated and divided by the number of classes minus one: 3−1=2. The third position presents an error of 1, because it does not matter to be wrong for a position or two, since the order and the distance do not matter. In total, the errors for these two vectors are 0, 0.5, and 1, calculating the mean that determines the degree of similarity between vectors: 1.5/3=0.5. Keep in mind that 0 represents the maximum similarity and 1 the maximum difference.

ii) Detection of Individualizing Elements

In this case, a multitasking neural network adapted from HyperFace is proposed (another possible alternative is the YOLOv3 network), which deals with detecting scars (creating a bounding box around them), detecting tattoos (by creating a bounding box around them), detecting moles/eczema/hair marks (by creating a bounding box around them), and detecting Darwin's tubercle on the ear (if present, a bounding box is located in the area).

Once the individualizing regions are located, their overlap is calculated using the metric "Dice", which is 1 when the similarity is maximum and 0 when it is minimum. The Dice value is available for each region/bounding box and the mean is calculated. To combine this number with that of the previous procedure, it is necessary to invert one of them, so that in both cases 0 and 1 refer to the same maximization or minimization criterion sought.

iii) Calculation of Asymmetry

Asymmetry is calculated after registering both faces. First, the background of the image is removed. The "reflection" transformation is then applied and the difference between an image and its mirror image is calculated. This difference is a number that indicates the degree of symmetry of the face in question. This process must be applied twice, once for each facial image. And the difference between the number obtained for both faces is calculated in absolute value. This value refers to a degree of overall (or holistic) asymmetry. If this value is zero, it means that the asymmetry found on both faces, at the numerical level, is the same.

iv) Obtaining the Overall Indicator of Morphological Analysis

All the criteria of the previous procedures are added, taking into account the weighting of each one (since certain criteria are more decisive than others), in order to unify the identification value of this stage into a single value. For two faces to be considered the same with total certainty, their asymmetric regions must coincide, the classification obtained from the facial criteria must coincide, as well as the individualizing elements including scars, moles and tattoos. Each of these criteria is adequately weighted based on objective data obtained in an experimental process.

Specifically, the total aggregation value in this stage is the result of applying the following formula:

$$x11*w11+x12*w12+x13*w13$$

where:
  x11 is the value provided by procedure i) of labeling with morphological descriptors, and w11 is the weight of said procedure within this stage (less than the weight w12 of procedure ii), which is the reference within this stage);
  x12 is the value provided by procedure ii) for the detection of individualizing elements, and w12 is the weight of said procedure within this stage (the most decisive within the morphological analysis);
  x13 is the value provided by procedure iii) for calculating the asymmetry, and w13 is the weight of said procedure (the least of all of them, both due to the initial aspect of the current approximation and due to its overall importance within the entire stage). In a preferred embodiment, the weights with which the overall indicator of the morphological analysis is calculated can be the following:

x11*0.3+x12*0.6+x13*0.1

STAGE 2. Holistic comparison (I2): In the same way that a human being performs a holistic comparison through an overall observation of facial features to issue a first opinion on whether two people are the same, in this case an algorithm of machine learning that performs the same task. The holistic comparison stage is automated through the use of Siamese networks. In this case, a Siamese network is trained, so that, at each iteration of the network, during training, it is presented with a target image, a positively matched image, and a negatively matched image. The goal is for the network, given a training set, to be able to provide a value between 0 and 1 that indicates the degree of confidence that both photos show the same person.

STAGE 3. Superposition of facial images (I3): The objective of this stage is to superimpose the facial images, automating the facial overlay process described above and the comparison of contours and segmented regions in both images (I1, I2). At this stage, several automatic procedures are distinguished:
  i) Registration of the images to obtain their overlap.
  ii) Segmentation of the regions and facial contours.
  iii) Comparison of silhouettes and segmented regions.
  iv) Obtaining a single overall indicator of the overlap.

i) Registration and Overlapping of Images (I1, I2)

Once the two images (I1, I2) to be compared are available, the registration of both is carried out in order to obtain their overlap. The registration is carried out after automatically detecting the pupils of the eyes in both images and calculating, in the 2D-2D case, the similarity transformation (which includes scaling, translation, rotation and reflection) that aligns them. It is important to note that, at this point, the proportions are not altered, but the only thing that is intended is to overlap, in the best possible way, both images to verify if they are consistent. In the case of a 2D facial image and a 3D facial image (that is, for example, a surface scan of a face/head), the transformation to be carried out is projective and not of similarity, increasing the overlying of the 2D facial image and the 2D projection of the 3D facial image.

ii) Segmentation of Contours and Facial Regions

Once both images are aligned, the eye, eyebrow and mouth regions are segmented; and the contours of the forehead, ears, nose and chin are delineated. Images previously segmented manually can be taken as starting data, or by performing an automatic previous segmentation of facial images. Segmentation of facial images involves segmenting the silhouette of the facial region in the case of a two-dimensional image, or segmenting its volume in the case of three-dimensional images such as 3D facial scans. Segmentation can be done manually (through tedious, slow and error-prone human intervention), semi-automatic (through direct human intervention or supervision in any of the phases of the segmentation algorithm), or even automatic (when the intervention of the human operator to obtain the result of the segmentation is non-existent). In a preferred embodiment, automatic segmentation is performed using a deep neural network that comprises the following steps:
  1. Collection of a set of facial images and the correct segmentation of the facial region (known as collection of the real data on the ground or "ground truth", GT, or training data set). From the data set from training, the network learns by itself to segment bone images.
  2. Network training for one or more particular facial regions using the backpropagation method.
  3. With the neural network trained to automatically segment certain facial regions in a facial image (for example, those previously mentioned: eyes, eyebrows, mouth, forehead, ears, nose and chin), the segmentation method can be validated with cases other than those observed above in training to be used in real cases.

In any case, and depending on the number of training examples available, a deformable model or a deep neural network can be used.

Unlike classical segmentation approaches, this particular realization of segmentation, based on deep artificial neuron networks, makes it possible to automatically identify, from the data itself (and without any kind of human supervision, part of the data set of correctly annotated training) complex patterns.

iii) Comparison of Silhouettes and Segmented Regions

These silhouettes and segmented regions are then automatically compared. This phase is comprised in turn, by the following sub-phases:
  1. Analysis of the consistency of the morphological curves or facial silhouettes in both images. It is about verifying if two curves follow the same shape or, in other words, if one curve is a reflection of the other. An example would be checking whether the forehead curves in two photographs are consistent (that is, whether one follows the other). For this, there are classic computer vision algorithms that can model relationships such as Curve_A follows Curve_B, Curve_A is consistent with Curve_B, and Curve_A is the mirror image of Curve_B, among others.
  2. Evaluation of the overlapping of the segmented regions by means of classic similarity metrics in segmentation: "Dice Similarity Coefficient" and "Hausdorff Distance". The metric "Dice" provides a value between 0 and 1, with 1 being a perfect overlap between two regions, and 0 being a non-existent overlap. On the other hand, the Hausdorff distance measures distance between contours. The segmented regions are preferably compared by means of the Dice Similarity Coefficient (since Hausdorff Distance does not provide a value between 0 and 1 by default, and it would be necessary to normalize its value by dividing it by the diagonal of the image).

iv) Obtaining the Overall Overlay Indicator

The previous sub-phases, applied to each facial region i, provide a Yi value between 0 and 1 that must be added, which represents the correspondence value of the subjects shown in both images for this stage. For each of the seven anatomical elements of interest, an indicator between 0 and 1. Specifically, there are four closed regions (eyes, eyebrows, nose and mouth) and three open silhouettes (forehead, chin and ears). Each of these anatomical elements has a weight, being more reduced for the forehead and ears, given a greater possibility of occlusions that can hide them. The weights can be as follows: w_eyes=w_eyebrows=w_nose=w_mouth=w_chin=0.18 and w_forehead=f_ears=0.05. A total value of 1 implies perfect overlap/continuity between contours and regions; and a value of 0 implies a non-existing overlap/continuity.

STAGE 4. Photo-anthropometric stage (I4) or estimation of 3D proportionality indices from 2D. This stage consists of an automatic tool for capturing facial proportionality measures and indices in which several automatic procedures are distinguished:

i) Automatic location of facial landmarks and estimation of 2D indices.

ii) Estimation of compatible 3D indices.

iii) Obtaining a single overall indicator of photo-anthropometry.

i) Automatic Location of Landmarks and Estimation of 2D Indices

For the calculation of the indices it is necessary to mark the 2D or 3D images (in the case of a 3D model of the face). Said marking can be done manually, or by means of an algorithm for automatic detection of landmarks based on deep neural networks. To estimate the 2D indices, the Euclidean distance between marks is calculated, the distances are estimated and then the proportions between them are calculated.

ii) Estimation of 3D Indices

Also based on machine learning, possible 3D proportionality indices are estimated from 2D values; for example, given a photograph of an unidentified subject, the system calculates the 3D index range of the person shown in the photo. This estimation is based on the application of ordinary linear least squares regressions, calculating the values $X_1, \ldots, X_k$ so that the error $\epsilon$ is as small as possible in the sense of least squares. In other words, the root mean square error $\epsilon$ of the formula is reduced when applied to the data, for example:

$$\overline{\epsilon} = \sqrt{\frac{1}{q}\sum_i \epsilon_i^2}$$

Regression is used to predict the value of a 3D index from the values of the 2D indexes in a photograph. The regression formula provides a single value Y of the 3D index, which is the most likely of the possible values. In this case, it is about predicting the range of all possible values rather than the most probable. To do this, the error E is taken into account. Assuming normality conditions, if $E_a$ is the largest possible error value (where a is the confidence level), the range of possible values is $[\hat{Y}-\epsilon_\alpha, \hat{Y}+\epsilon_\alpha]$ (equation 1). Furthermore, $\epsilon$ follows a Student's t distribution, for example: where $$\epsilon_\alpha = T_{\alpha,q-1} s_q \sqrt{1 + 1/q}$$

where $S_q$ is the variance of $\epsilon_1, \ldots, \epsilon_q$.

There are two types of errors when predicting an interval. If the range is too small, it results in one or more valid values being tagged as incompatible, leading to mistakenly excluding the correct candidate. On the other hand, if the interval is too large, the comparison becomes less efficient, but the reliability is not compromised. For this reason, and as a precautionary measure, the prediction interval has been designed greater than in equation 1 by means of a factor $\lambda$, resulting in the following interval: $[\hat{Y}-\lambda\epsilon_\alpha, \hat{Y}+\lambda\epsilon_\alpha]$ In this way, Type I errors and the exclusion of a candidate with possible compatible 3D indices are avoided.

iii) Obtaining an Overall Indicator of Photo-Anthropometry

Finally, the indices estimated in the reference photograph are compared with the indices estimated in the questioned photograph to check if the ranges are compatible (and providing a value between 0 and 1 relative to said compatibility). This algorithm takes into account the estimation of the subject's pose in the photograph to give a range of estimated values. It is important to note that, in this case, we speak of compatibility because the values fall within the range of identification or exclusion, otherwise, of the candidate subject.

STAGE 5. Aggregation aimed at decision-making (I5): the decision-making is based on calculating a fuzzy value or numerical value, within a scale preset or previously bounded interval (in particular, a value between 0 and 1), using soft computing techniques from:

measures corresponding to the different FFC methodologies (morphological analysis, holistic comparison, photo-anthropometry, and overlay), and a set of decision support data outside the facial image comparison process itself (for example, the reliability of a certain methodology or criterion within a methodology, as well as the quality of facial images).

This numerical value reflects the quality of the matching of the facial images and thus provides an indicator of the probability that the facial images correspond to the same subject.

To get this numerical value, it is employed a fuzzy hierarchical model comprising two levels:

Level 2: It provides the information obtained by the different methods used by FFC. This level contains 4 stages, one for each of the existing method families (morphological analysis, holistic comparison, photo-anthropometry, and overlay).

Level 1: It adds the information of all the methods used, together with the weighting of the reliability of each method, in order to provide a metric (between 0 and 1) that shows how compatible both images are in order to represent the same subject. The aggregation function, in a particular embodiment, for level 1 is the arithmetic mean or the geometric mean.

Each of the stages used is combined, weighing each one by its power of identification. Specifically, E1*WE1+ E2*WE2+E3*WE3+E4*WE4, where E1 corresponds to the value obtained in Stage 1 (morphological comparison), E2 corresponds to the value obtained in Stage 2 (holistic comparison), E3 corresponds to the value obtained in Stage 3 (overlay), and E4 corresponds to the value obtained in Stage 4 (photo-anthropometry); and the Ws values correspond to the weights associated with each stage. In a preferred embodiment, based on forensic practice and related scientific studies, WE1=0.4, WE2=WE3=WE4=0.2. The only mandatory stage is Stage 1 (I1); in case any of the other stages are missing, WE1 is increased to reach 1.0. For example, in a situation in which only the values E1, E2 and E3 exist, it is weighted with the following weights: WE1=0.6 and WE2=WE3=0.2. If two stages are missing, the weights are as follows: WE1=0.8; WE2=0.2.

Figure 2:
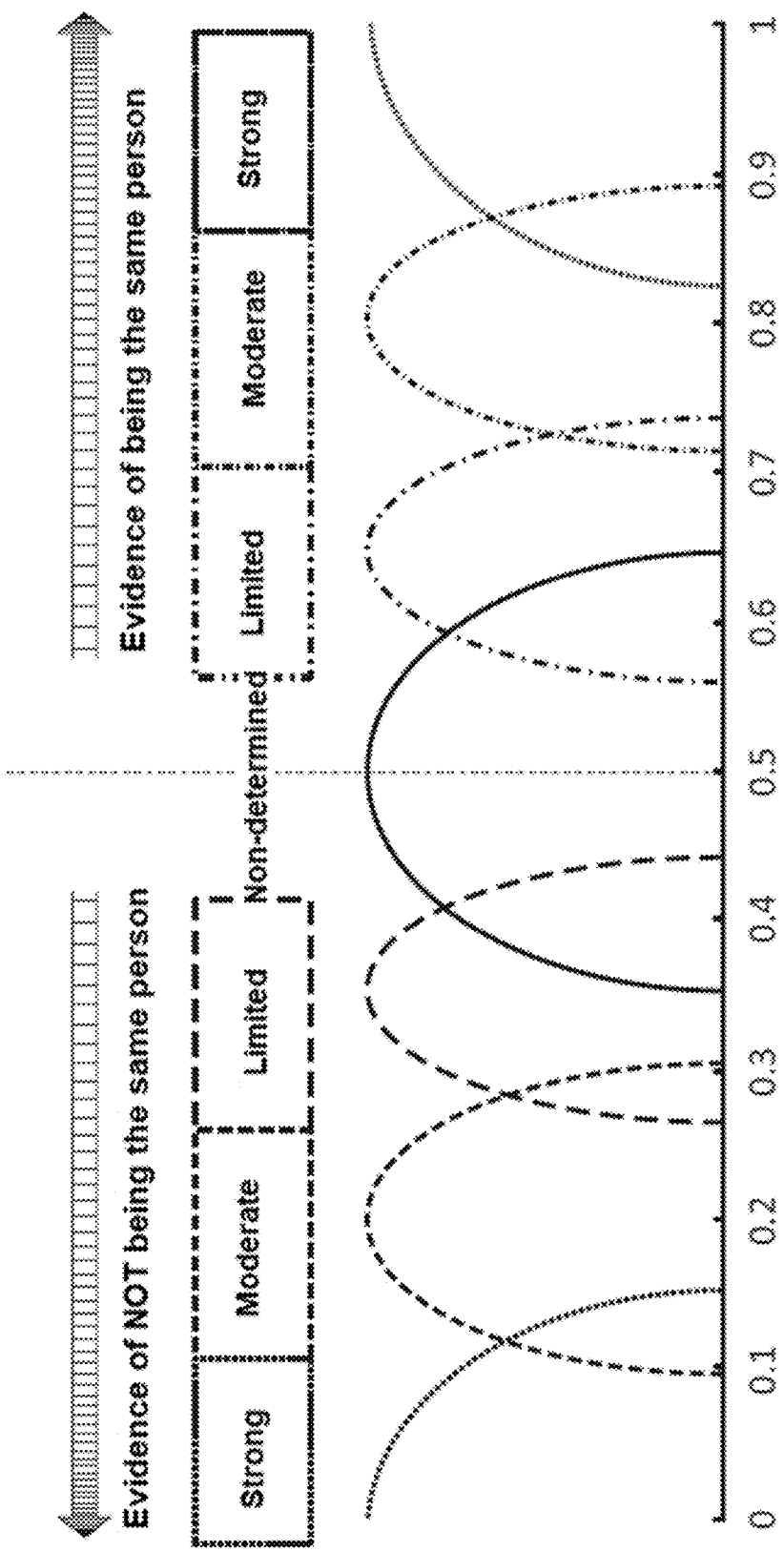
FIG. 2.—It shows a graphical representation of the values of the degree of confidence in facial identification through membership functions based on the aggregation of all available information.

It can be seen in FIG. 2 an example of the interpretation of a numerical value obtained in Stage 5 (I5), which shows the degree of confidence in the identification through membership functions based on the aggregation of all available information.

This confidence manifests itself gradually based on the evidence of whether both images (I1, I2) correspond to the same person, i.e., values of the degree of confidence between 0.5 and 1, represented on the right side (B) of FIG. 2, or they do not correspond to the same person, i.e., values of the degree of confidence between 0 and 0.5, represented in the left part (A) of FIG. 2).

Table 1 shows an estimate of the time taken by an expert official to carry out each of the FFC stages completely manually against the estimated time to perform the described procedure that performs the FFC stages automatically.

TABLE 1

| STAGE | ESTIMATED MANUAL TIME | ESTIMATED AUTOMATIC TIME |
|---|---|---|
| Morphological analysis | 360 min | Seconds |
| Holistic comparison | 30 min | Seconds |
| Overlap | 120 min | Seconds |
| Photo-anthropometry | 200 min | Seconds |
| Total | 710 min | About 1-2 minutes |

Table 2 summarizes the main advantages provided in each of the stages by the described automatic FFC procedure compared to the conventional manual FFC procedure.

TABLE 2

| STAGE | DISADVANTAGES MANUAL FFC | ADVANTAGES AUTOMATIC FFC |
|---|---|---|
| Morphological analysis | Absence of a standardized set of facial features. Limited studies on the precision and reproducibility of the methodology. Completely subjective evaluation process. | Proposal for a standardized set of facial characteristics. Labeling and automatic description of the previous facial criteria. Systematic and reproducible process. More objective process through quantification of the error made when labeling facial features. |
| Holistic comparison | Completely subjective process not based on any experimental or empirical data. | Automatic procedure that provides a confidence value on the correspondence of the images. |
| Overlap | Manual image alignment, tedious process. There exists the possibility of distorting the images to skew and justify a conclusion. The degree of compatibility of the overlapping images is estimated subjectively based on observation. | Automatic registration of images by calculating the similarity of the transformation. The degree of compatibility of the images is estimated objectively using a metric of overlap of regions and facial contours. |
| Photo-anthropometry | Subjective landmarks location Absence of photogrammetric scale (pixels) Very restrictive image conditions (same pose in both photos) | Automatic location of landmarks in a systematic and objective way Does not require photogrammetric scale Estimation of 3D measurements from 2D measurements Does not require such restrictive imaging conditions (regardless of the pose of the subject in the photograph) |

The invention claimed is:

1. An image analysis system for forensic facial comparison, comprising:
   image acquisition means for acquiring at least one questioned image (I1) of a subject,
   processing means with access to the questioned image (I1) and at least one reference image (I2);
   wherein the processing means automatically perform the forensic facial comparison by comparing the questioned image (I1) with the reference image (I2), wherein the processing means are configured to perform at least one stage of morphological analysis (I1) of forensic facial comparison by means of neural networks, and a decision-making stage (I5) to obtain a fuzzy value applying soft computing, wherein the fuzzy value is an indicator of the probability that the questioned image (I1) and reference image (I2) correspond to the same subject; and wherein the morphological analysis step (I1) comprises:
   labelling by means of a first neural network the questioned image (I1) and the reference image (I2) with morphological descriptors, said morphological descriptors representing anatomical and/or morphological aspects of a face; comparing the morphological descriptors labelled within the questioned facial image (I1) and within the reference facial image (I2) and calculating a degree of similarity between the morphological descriptors labelled within the questioned facial image (I1) and within the reference facial image (I2), obtaining a value x11;

detecting by means of a second neural network individualizing elements in the questioned image (I1) and in the reference image (I2), comparing the individualizing elements detected in the questioned facial image (I1) and in the reference facial image (I2) and obtaining a degree of similarity between the individualizing elements detected in the questioned facial image (I1) and in the reference facial image (I2), obtaining a value x12;

calculating a degree of asymmetry between the questioned image (I1) and the reference image (I2), obtaining a value x13, by calculating the difference between a degree of symmetry of the questioned image (I1) and a degree of symmetry of the reference image (I2), the degree of symmetry of the questioned image (I1) calculated as the difference between the questioned image (I1) and its mirror image, and the degree of symmetry of the reference image (I2) calculated as the difference between the reference image (I2) and its mirror image;

obtaining a value, E1, which is an overall indicator of the forensic facial comparison stage of morphological analysis (I1), wherein E1=x11*w11+x12*w12+x13 w13, wherein w11, w12 and w13 are configurable weights that meet w12>w11>w13.

2. The system according to claim 1, wherein the first neural network is a multiclass network and the second neural network is a multi-task network.

3. The system according to claim 1, wherein the weights of the morphological analysis stage (I1) are w12=0.6, w11=0.3 and w13=0.1.

4. The system according to claim 1, wherein the processing means are configured to also perform a holistic comparison step (I2) of forensic facial comparison using siamese networks, which provide a value, E2, overall indicator of the holistic comparison stage (I2) that indicates a degree of confidence with which the questioned and reference images (I1, I2) show the same subject.

5. The system according to claim 1, wherein the processing means are configured to further perform a step of superimposing facial images (I3) for forensic facial comparison comprising:

applying a transformation, of similarity if the two questioned and reference images (I1, I2) are two-dimensional, or projective if at least one of the two questioned and reference images (I1, I2) is three-dimensional, to align the two questioned images and reference (I1, I2);

segmenting silhouettes and facial regions in the questioned and reference images (I1, I2) using a deformable segmentation model or a deep neural network;

comparing the silhouettes and segmented facial regions, to obtain a value Yi indicating the correspondence between the questioned image (I1) and the reference image (I2) in each facial region i;

obtaining a value, E3, which is an overall indicator of the facial image overlay stage (I3), wherein E3=ΣYi*wi, wherein i denotes a facial region and wi a configurable weight assigned to the facial region i.

6. The system according to claim 1, wherein the processing means are configured to also perform a photo-anthropometry step (I4) of forensic facial comparison comprising:

detecting marks in the two questioned and reference images (I1, I2) using deep neural networks and estimating two-dimensional indices of the questioned image (I1) and the reference image (I2) by calculating a Euclidean distance between the marks detected in the questioned image (I1) and in the reference image (I2) respectively;

estimating three-dimensional indices of the questioned image (I1) and the reference image (I2) by calculating a least squares linear regression starting from the estimated two-dimensional indices of the questioned image (I1) and the reference image (I2) respectively;

obtaining a value, E4, which is an overall indicator of the photo-anthropometry stage (I4), by comparing the indices in three dimensions estimated from the questioned image (I1) with the indices in three dimensions estimated from the reference image (I2).

7. The system according to claim 1, wherein the processing means are configured to, in the decision-making stage (I5), obtain the fuzzy value as the sum of the overall indicator value of each forensic facial comparison stage performed by the processing means, each value used in the sum weighted by a defined weight based on a set of data to support the decision-making stage (I5) indicative of a degree of reliability of the forensic facial comparison stage performed, and indicative of the quality of the questioned and reference images (I1, I2).

8. The system according to claim 1, wherein the questioned image (I1) and the reference image (I2) have the same dimensionality, in two dimensions or in three dimensions.

9. The system according to claim 1, wherein the questioned image (I1) and the reference image (I2) have a different dimensionality, in two dimensions or three dimensions.

* * * * *